United States Patent [19]

Carbone

[11] 3,747,448
[45] July 24, 1973

[54] RECIPROCATING CUTTING APPARATUS
[75] Inventor: Angelo F. Carbone, Brooklyn, N.Y.
[73] Assignee: Emmanuele Fallacaro, Commack, N.Y.; a part interest
[22] Filed: Dec. 29, 1971
[21] Appl. No.: 213,355

[52] U.S. Cl. .......................... 83/4, 83/427, 83/437, 83/527, 83/777
[51] Int. Cl. ........................ B26d 3/28, B23d 51/02
[58] Field of Search ............... 83/4, 556, 707, 726, 83/730, 427, 437, 769, 784, 786, 643, 662, 527, 777

[56] References Cited
UNITED STATES PATENTS

| | | |
|---|---|---|
| 2,821,254 | 1/1958 | Kernen .................................. 83/4 |
| 3,212,376 | 10/1965 | Berenbak et al. ..................... 83/4 |
| 1,771,496 | 7/1930 | Lequillon ......................... 83/437 X |
| 3,171,313 | 3/1965 | Ohlenroth ....................... 83/437 X |
| 3,393,538 | 7/1968 | Mercier ............................... 83/4 X |
| 3,153,363 | 10/1964 | Hoenke ............................... 83/427 |
| 3,277,846 | 10/1966 | Kesselman ......................... 83/4 X |
| 3,179,317 | 4/1965 | Voelker ............................... 83/4 X |

Primary Examiner—J. M. Meister
Attorney—Allison C. Collard

[57] ABSTRACT

A reciprocating cutting apparatus particularly suited for cutting bulk materials, consisting of an elongated longitudinally tensioned cutting blade disposed across a material carriage, and coupled at one end to a reciprocating power source. The blade is tensioned against sagging so the bulk material, such as honeycomb structures, can be sliced at even depths across its entire width. The reciprocating power source moves the cutting blade not only transversely with respect to the movement of the material, but also longitudinally in and out as the material is cut.

3 Claims, 5 Drawing Figures

INVENTOR
ANGELO F. CARBONE
ATTORNEY.

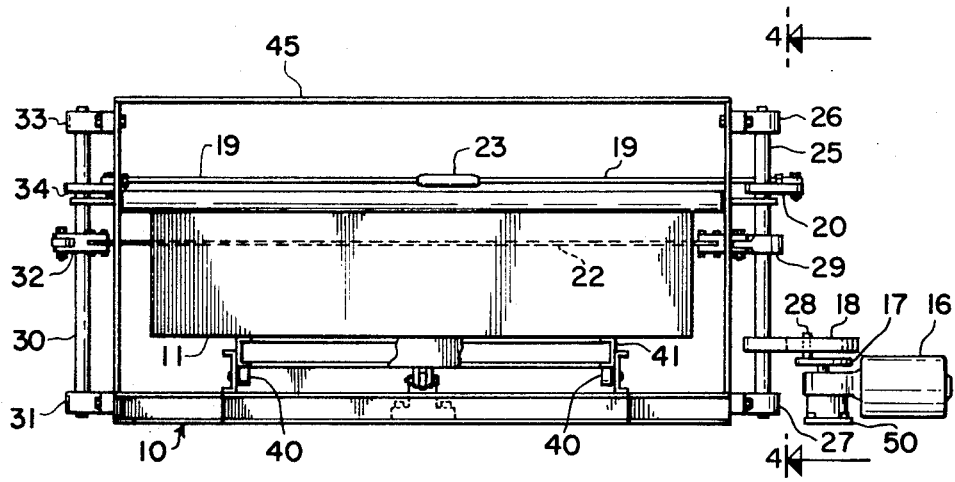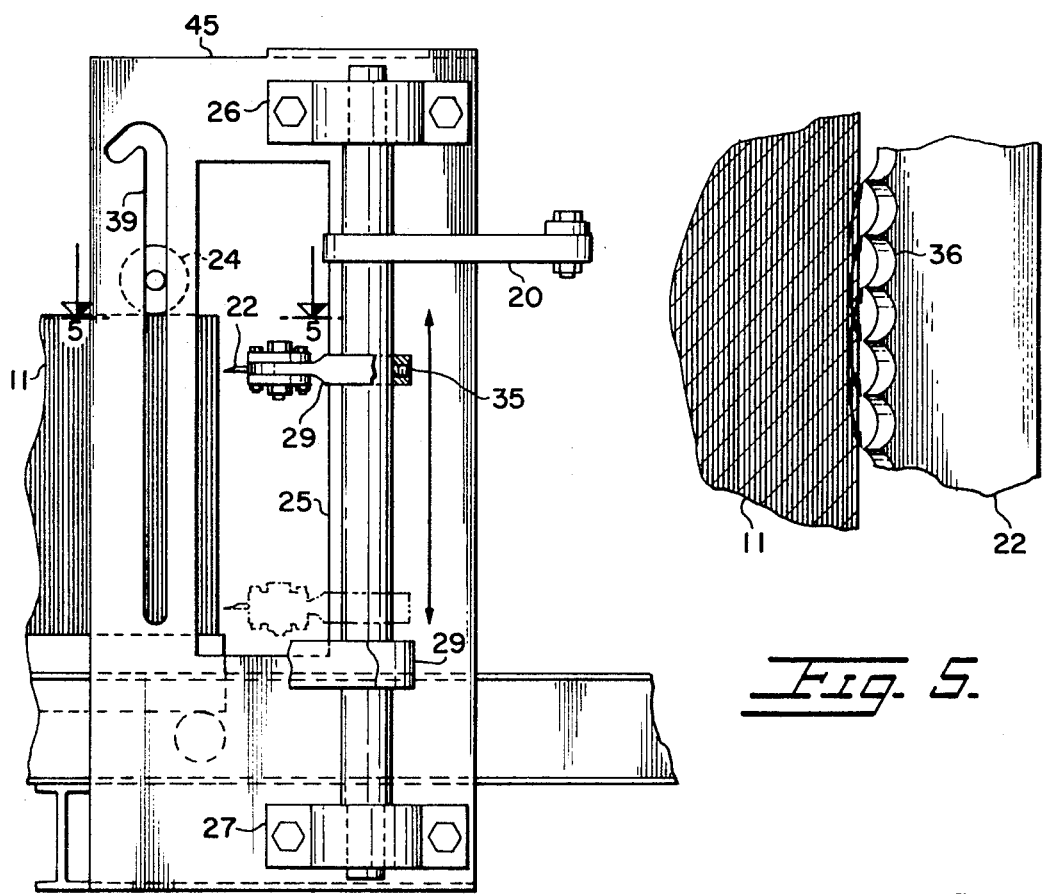

RECIPROCATING CUTTING APPARATUS

This invention relates to a reciprocating cutting apparatus.

More specifically, this invention relates to a reciprocating cutting machine particularly suitable for slicing bulk materials such as honeycomb structures.

Honeycomb structures are manufactured by machines which take sheets, strips, or a web of material, and stripe the material with an adhesive so that the material can be bonded together to form the honeycomb structure. In some cases, the honeycomb structure produced has a larger depth than desired and must thus be cut to a predetermined depth for use as an architectural material. Honeycomb structures are generally manufactured from a sheet material such as fire-retardent paper, metal foil and the like. Attempting to cut this material using conventional cutting devices have resulted in the production of honeycomb structures of uneven depth and non-uniform planar shape.

Accordingly, the present invention provides a cutting apparatus particularly suitable for cutting folded or compressed honeycomb material, and utilizes an elongated horizontally tensioned cutting blade. The blade is coupled at one end to a reciprocating power source so that it not only moves back and forth across the advancing honeycomb structure but also into and away from the material with respect to feed of the advancing material.

It is therefore an object according to the present invention to provide a reciprocating cutting apparatus capable of cutting wide bulk materials at even depths.

It is another object according to the present invention to provide an apparatus for cutting bulk materials having a tensioned cutting blade which reciprocates across the width of the material.

It is still a further object according to the present invention to provide a reciprocating cutting apparatus which is simple in design, inexpensive to manufacture, and reliable in operation.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings wherein similar reference characters denote similar elements throughout the several views:

FIG. 3 is another side view of the cutting apparatus of the subject invention;

FIG. 4 is a cross-sectional view taken through section 4—4 of FIG. 3; and

FIG. 5 is a cross-sectional view taken through section 5—5 of FIG. 4.

Figure 1:
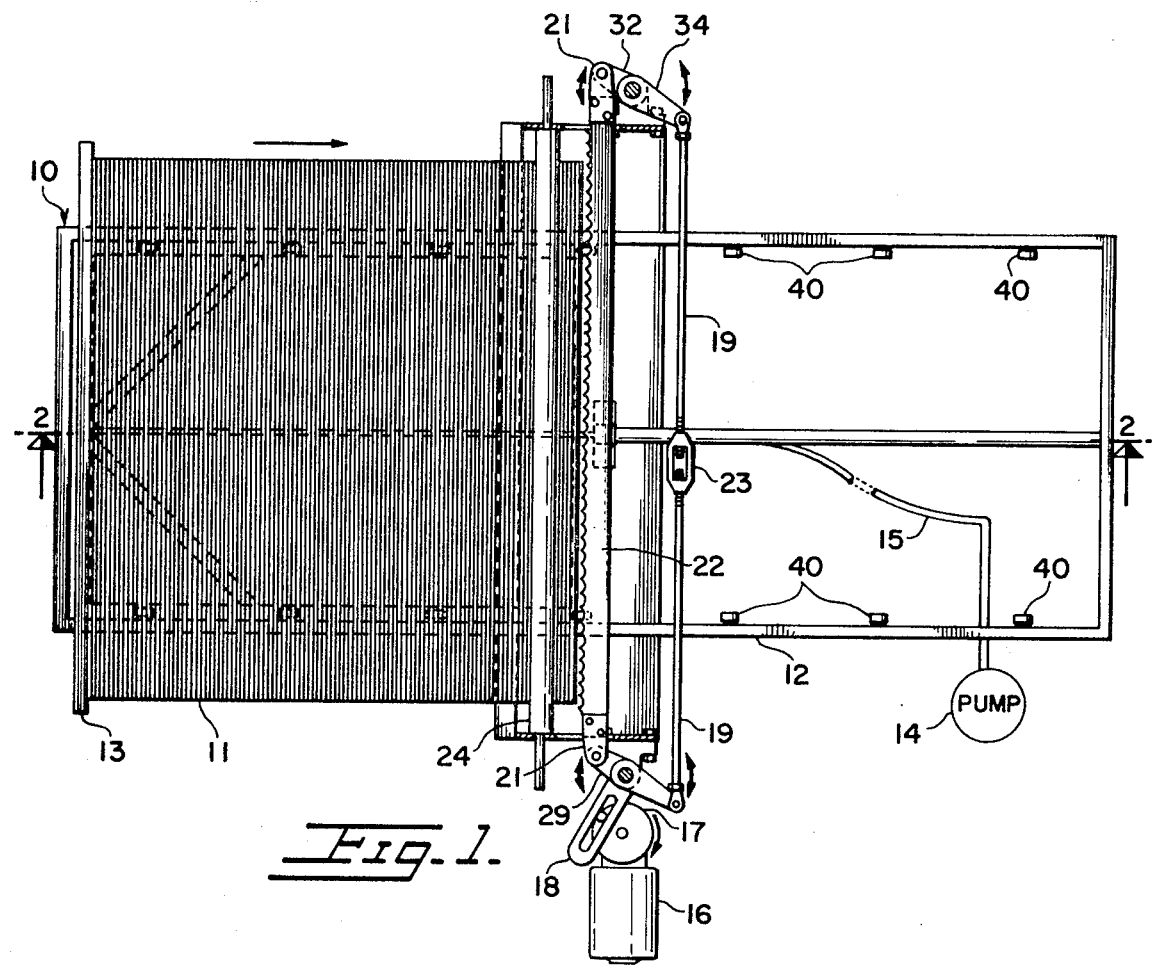
FIG. 1 is a top plan view of the cutting apparatus of the subject invention taken through section 1—1 of FIG. 2.
Figure 2:
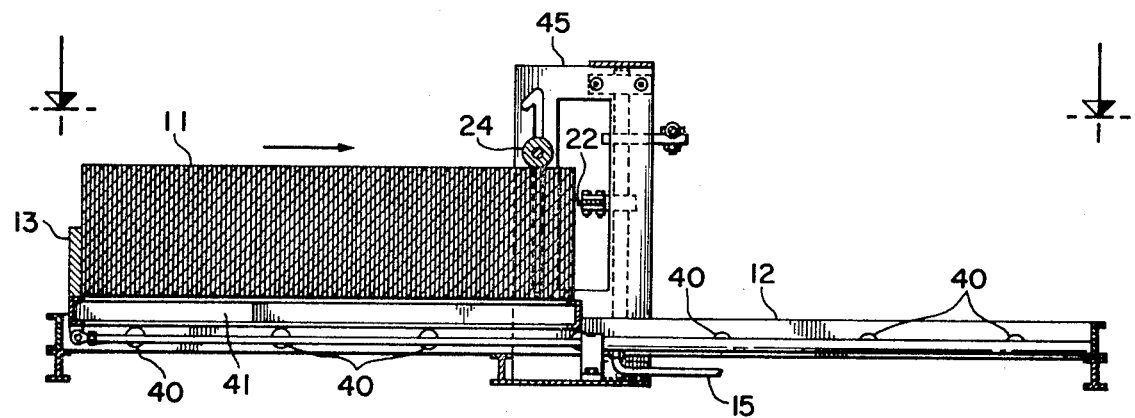
FIG. 2 is a side plan view partly in cross section taken through section 2—2 of FIG. 1.

Referring to FIGS. 1 and 2, there is shown the cutting apparatus of the present invention having a wide bulk material 11 mounted on its frame 12 for movement against a cutting blade 22.

Cutting blade 22 is secured at each end to end brackets 21 which are pivotably coupled to levers 29 and 32. In this embodiment, blade 22 is disposed horizontally within a vertical box frame 45 secured to housing 10 of the cutting machine. Bolted at each end of frame 45 are bearings 31 and 33, and bearings 27 add 26 which pivotably support vertical shafts 30 and 25 respectively. Levers 29 and 32, which are pivotably coupled to the ends of blade 22, are joined on shafts 30 and 25. As shown in detail in FIGS. 3 and 4, the height of blade 22 can be adjusted with respect to the bulk material to be cut by means of adjustment screws 35 mounted on levers 29 and 32. Another setting of lever 29 is shown in broken line near the bottom of shaft 25 in FIG. 4. Blade 22 is preferably constructed of thin hardened steel and has a tendency to deflect downward or sag due to its own weight. In order to prevent the blade from sagging and cutting material at uneven depths, a torsion bar 19 is provided coupled to shafts 25 and 30 by means of linkages 20 and 34 respectively. Linkages 20 and 34 are secured to their respective shafts so that when a turn buckle 23, (threadably coupled to the centered ends of bars 19) is rotated, the tension of bars 19, and therefore blade 22 can be adjusted. By tightening turnbuckle 23, substantially all of the sag can be removed from blade 22.

A motor drive 16 is coupled to a right angle gear reduction box 50 in order to rotate a drive wheel 17 in the direction as shown by the arrow in FIG. 1. Near the circumference of drive wheel 17 is positioned a drive pin engaged for movement in a slot on lever 18. Lever 18 is secured to shaft 25 so that when motor 16 is operating, a reciprocating motion is provided on shaft 25. If blade 22 were to be pivotably coupled to the axes of shafts 25 and 30, it would reciprocate only along a single horizontal direction. However, by displacing blade 22 a short distance away from the axes of shafts 25 and 30, by means of linkages 29 and 32, blade 22 also moves into and away from the material as it reciprocates horizontally. This permits teeth 36 of the blade to engage and free themselves periodically from the advancing material as shown by the directional arrows in FIG. 5.

Bulk material 11 is preferably mounted on a rack 41 which moves across a plurality of rollers 40 into reciprocating blade 22. A weighted roller 24 slidably mounted in a slot 39 in frame 45, maintains bulk material 11 in a stable horizontal position while it is being cut. A backboard 13 may be provided on rack 41 to urge the material against blade 22. A hydraulic pump 14 is connected to hydraulic line 15, which is in turn coupled to rack 41, so that an even pressure can be applied to a hydraulic cylinder on the rack in order to advance material 11 into cutting blade 22. The hydraulic cylinder, or other conventional means can be connected to the end of hydraulic line 15 and mechanically coupled to rack 40, as is well known in the prior art.

The cutting apparatus of the subject invention is preferably designed for cutting large honeycomb structures to the proper depth after they are fabricated on a honeycomb producing machine. In a particular type of honeycomb fabricating machine, whereby the honeycomb structure is produced continuously, the cutting apparatus of the subject invention can be positioned at the output of the machine to continuously cut the honeycomb to the proper depth shortly after it is produced. Blade 22, in this embodiment, includes a scalloped toothed edge which has been found advantageous for the cutting of paper products. However, blade 22 may also be provided with a hack saw toothed edge or a smooth cutting edge depending upon the material to be cut. As indicated earlier, the height of blade 22 can be easily adjusted on shafts 25 and 30 so that any desired thickness of bulk material can be cut. The speed of reciprocation can be adjusted by adjusting the speed of motor 16 or changing the gears in reduction box 50. Likewise, the excursion traversed by blade 22 can be lengthened or shortened by changing the diameter of flywheel 17. The speed in which the material is advanced into blade 22 can also be adjusted by regulating pump 14.

While only a few embodiments of the present invention have been shown and described, it is obvious that many changes and modifications may be made thereunto without departing from the spirit and scope of the invention.

What is claimed is:

1. An apparatus for cutting bulk material to a desired thickness, comprising:
    a housing having a movable carriage for supporting the bulk material;
    a pair of spaced-apart parallel shafts pivotably supported in a plane perpendicular to said housing;
    a pair of levers, each of which is secured about one of said parallel shafts, said levers containing brackets on their forward portions, and wherein one of said levers includes an extending slot;
    a sawblade pivotably disposed between the brackets so as to be parallel to the movable carriage for cutting the advancing bulk material;
    a threaded torsion bar pivotably disposed on the rearward portion of said links for tensioning said blade;
    driving means having an eccentric pin for engaging the extending slot of one of said levers, so that when said pin revolves, the extending slot oscillates said parallel shafts allowing said blade to reciprocate and cut into and out of the material,
    hydraulic means for advancing the movable carriage towards said blade;
    a weighted roller slidably supported in front of said blade for maintaining the bulk material while it is being cut; and
    means in each of said levers for frictionally clamping each of said levers to one of said parallel shafts so that said blade may be positioned vertically with respect to the movable carriage thereby allowing the material to be cut at different depths.

2. The apparatus as recited in claim 1, wherein said driving means includes an electric motor, and a right angle gear reduction box having its input coupled to the electric motor and its output connected to said eccentric pin so that as rotational power is supplied to the gear box, said pin revolves to oscillate said levers providing the cutting motion to said sawblade.

3. The apparatus as recited in claim 2, wherein said means in each of said levers comprises a screw engaging each of said levers for clamping said levers onto said parallel shafts.

* * * * *